United States Patent Office 3,522,721
Patented Aug. 4, 1970

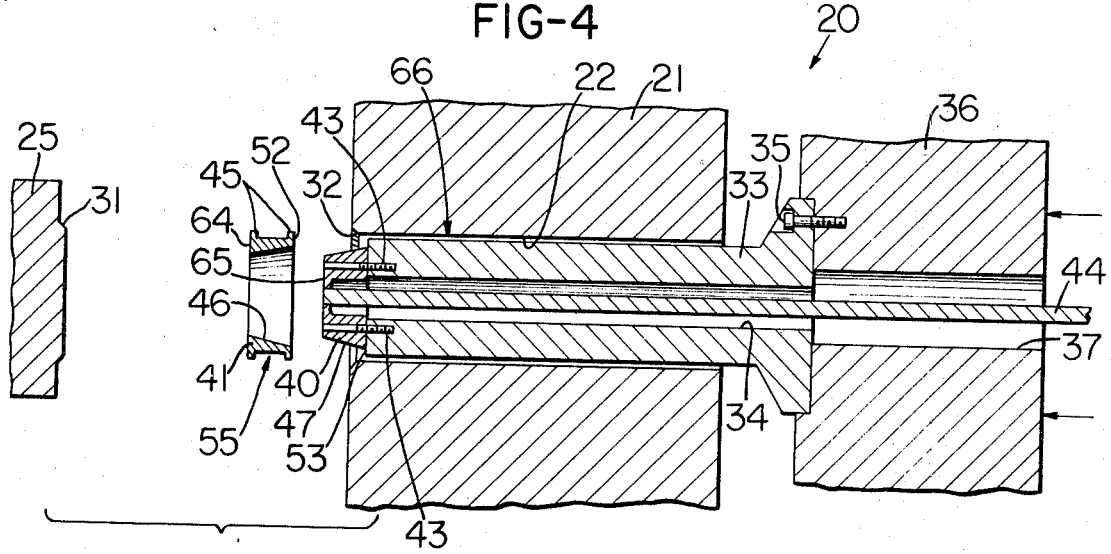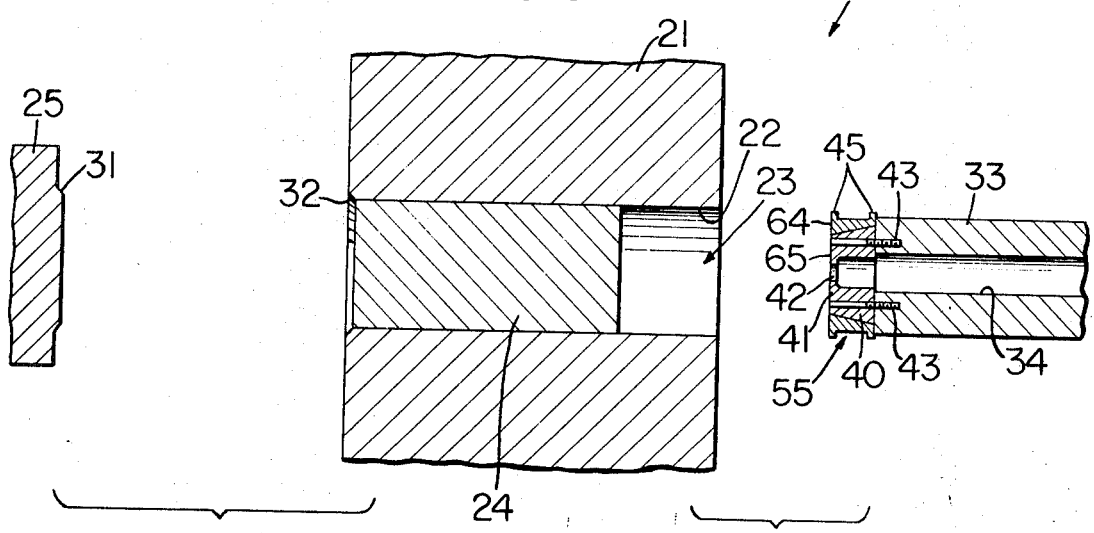

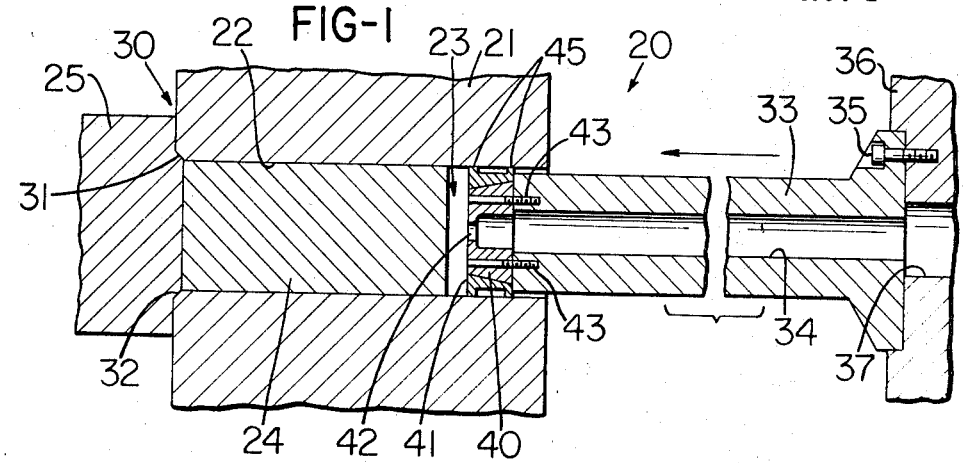
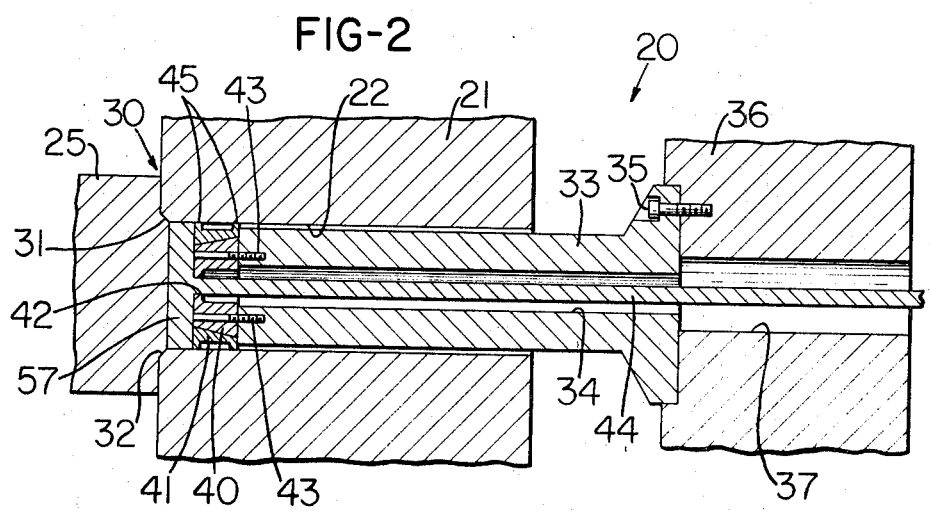
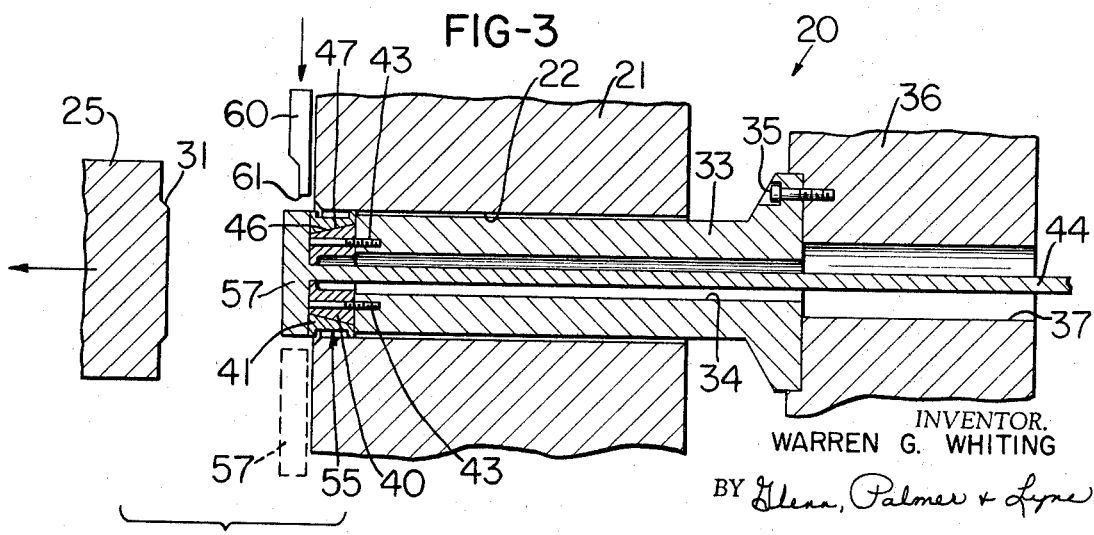

3,522,721
APPARATUS FOR AND METHOD OF MAKING INDIRECT EXTRUSIONS
Warren G. Whiting, Richmond, Va., assignor to Reynolds Metals Company, Richmond, Va., a corporation of Delaware
Filed Mar. 1, 1968, Ser. No. 709,664
Int. Cl. B21c 23/00
U.S. Cl. 72—255                           20 Claims

ABSTRACT OF THE DISCLOSURE

This disclosure relates to an improved apparatus for and method of making indirect extrusions utilizing a comparatively inexpensive and readily detachable die holder which is utilized and supported around an extrusion die which is fixed to the front of a hollow ram. The construction and arrangement of the die holder and die and the technique made possible by such construction and arrangement enable extruding to be achieved with optimum efficiency and economy.

BACKGROUND OF THE INVENTION

In indirect extrusion a die having a centrally arranged extrusion orifice is preferably fastened to the front of a hollow ram to assure accurate centering during extrusion of a billet contained within an associated container. However, after completing an extrusion stroke it is undesirable as well as difficult to retract the ram and its fastened die back through the container. In particular, retraction of the ram and die back through the container unnecessarily wears both the die and container because of the added sliding contact and also fouls the tooling because the die skims off part of the thin layer of billet material which adheres to the inside surface of the container. To help solve this wear problem, the die may be unfastened from the ram at the completion of an extrusion stroke whereupon the ram is then withdrawn from the container and the die is then refastened to it to begin another extrusion cycle; however, this approach requires considerable manual effort as well as substantially lengthening the extrusion cycle. If, in an effort to solve this wear problem, the die is pushed by the ram through the container and against the billet without fastening it to the ram it is practically impossible to precisely rotatably locate the die with respect to the ram and container to assure that successive extrusions will have the proper orientation. In addition, this latter approach requires considerable handling of a hot and comparatively heavy die with greater likelihood of damaging such die.

SUMMARY

This invention provides an improved apparatus for and method of making indirect extrusions rapidly, with minimum wear of cooperating parts, and with the extruded material leaving the extrusion apparatus oriented in the desired manner with each extrusion cycle, whereby the overall cost of making precise extrusions is kept at a minimum.

Other details, uses, and advantages of this invention will become apparent as the following description of the embodiments thereof presented in the accompanying drawings proceeds.

BRIEF DESCRIPTION OF THE DRAWINGS

The accompanying drawings show present preferred embodiments of this invention, in which—

FIG. 1 is a sectional view with parts broken away illustrating an exemplary embodiment of the apparatus of this invention wherein a billet which is to be extruded is supported within an open ended chamber of a container and a blank is held in position at one end of the chamber and further illustrating a hollow ram having a die fixed to its front end with a die holder supported concentrically therearound being relatively moved with respect to the container and billet at the beginning of an indirect extrusion cycle;

FIG. 2 illustrates the apparatus of FIG. 1 at the completion of an extrusion cycle and showing the position of the butt portion of the billet between the die and blank;

FIG. 3 is a sectional view similar to FIG. 1 showing the blank in a withdrawn position and the manner of pushing the butt portion from within the container to enable it to be sheared away by a suitable shear;

FIG. 4 is a sectional view similar to FIG. 3 showing the die holder separated from the die; and FIG. 5 is a sectional view with parts broken away illustrating the ram and attached die withdrawn from within the container and the die holder repositioned concentrically around the die and with a billet inserted within the chamber of the container in preparation for another indirect extrusion cycle.

DESCRIPTION OF ILLUSTRATED EMBODIMENTS

Reference is now made to FIG. 1 of the drawings wherein an improved apparatus of this invention designated generally by the numeral 20 is illustrated at the beginning of an indirect extrusion cycle. Apparatus 20 comprises a container 21 having an inside surface 22 which is of substantially right circular cylindrical outline and defines a chamber indicated generally by the numeral 23 which extends completely through container 21 and is adapted to receive a billet 24 of any suitable material which is to be indirectly extruded.

A plug or blank 25 is provided for sealing one end of chamber 23 as indicated at 30 in FIG. 1 and blank 25 may have an annular beveled surface 31 which is adapted to engage a cooperating annular surface 32 provided on container 21 to assure that a tight seal is provided upon holding the blank firmly against the container and thereby prevent escape of billet material during the extrusion process.

Extrusion apparatus 20 also comprises a ram 33 which has an extrusion receiving opening 34 extending substantially axially therethrough. Ram 33 is fixed as by bolts 35 in a cantilevered manner at the forward end of a support 36 which has an axial bore 37 extending therethrough and which is aligned with the axial opening 34 extending through the ram 33. The opening 34 and bore 37 enable the extruded material to be moved out of the apparatus 20.

The ram 33 has a die 40 fixed to its front end by a plurality of bolts or other methods of fastening each designated by the same numeral 43 and a cooperating die holder 41 is provided and supported concentrically around the die 40 to precisely locate and hold the die 40 accurately centered within the chamber 23 during extruding movement. The extruding movement is provided by relatively moving the ram 33, die 40, and die holder 41 toward the container 21 and against the billet 24 with the blank 25 firmly held in sealed engagement against the container 21.

It will be appreciated that this relative movement may be provided by holding the container 21, billet 24, and blank 25 stationary and moving the ram 33, die 40, and die holder 41 toward the container 21. Conversely, this relative movement may be achieved by holding the ram 33, die 40, and die holder 41 stationary and moving the container 21, blank 25, and billet 24 toward the die 40. Obviously, it may also be desired in certain applications to move both the container 21 and its associated parts and the die 40 and its associated parts toward each other. For simplicity, the present description will continue by considering the container and its associated parts as being held stationary with the die 40 and its associated parts being considered as the movable members.

The die 40 has a die orifice 42 extending centrally therethrough and die 40 is fixed to the front end of ram 33 by the bolts 43 so that the die orifice 42 is aligned with the opening 34 in ram 33. As the billet is engaged and compressed by the die 40 a rod-like member 44, see FIG. 2, having a peripheral configuration corresponding to the die orifice 42 is extruded through such orifice and through opening 34 and bore 37.

The die holder 41 is supported around die 40 in a readily detachable manner and has an outer sealing surface designated by the numeral 45 which is adapted to be slidably moved along the inside surface 22 of the container 21 to prevent the billet 24 from being extruded between the sealing surface 45 and the inside surface 22 during the extrusion stroke. The outer sealing surface 45 is of substantially right circular cylindrical outline corresponding to the configuration of inside surface 22 and providing a closely controlled sliding fit therebetween.

The die holder 41 is in the form of a protective ring and has an inner first surface of substantially frustoconical configuration which is designated by the numeral 46. The die 40 has a cooperating second surface which is also of substantially frustoconical configuration and is designated by the numeral 47. As will be apparent from the drawings the die 40 is a substantially disc-like member and the frustoconical surface 47 provided on die 40 defines its outer periphery. The frustoconical surfaces 46 and 47 are arranged so that they taper away from the ram 33 with the die 40 and die holder 41 installed in position at the front end of such ram and for a purpose to be subsequently described.

The die holder 41 is precisely located by its frustoconical surface 46 on the frustoconical surface 47 of the die 40 and the cooperating dimensional arrangement of such surface is such that as the die 40 and die holder 41 engage the billet 24 and extrude elongated member 44, as seen in FIG. 2, through the die orifice 42 the die 40 and die holder 41 will not tend to jam together. The die holder 41 also has a first bearing surface defining its inner end and designated by the numeral 52, see FIG. 4.

The ram 33 in this example of the invention has a right circular cylindrical configuration which is substantially smaller in diameter than the right circular cylindrical configuration of the surface 22 defining chamber 23 in container 21 and the die 40 is fixed to the front end of ram 33 so that is frustoconical surface 47 tapers away from the ram 30 as previously mentioned, whereby the maximum diameter portion of the die 40 adjoins the front end surface of the ram 33. However, the maximum diameter portion of the die 40 is smaller in diameter than the diameter of the ram 33 so that such ram has an annular bearing surface designated by the numeral 53 which extends radially outwardly beyond the outer periphery of the die 40.

The dimensional tolerances of the frustoconical surfaces 46 and 47 and the arrangement of the surfaces 52 and 53 is such that the bearing surface 52 on the die holder supports substantially all axial forces exerted against the die holder 41 while the frustoconical surfaces 46 and 47 prevent jamming as previously mentioned. To explain this matter in another way, during the extrusion of the billet 24 in the manner illustrated in FIG. 2, forces exerted by the billet 24 against the die holder 41 are transmitted directly by the die holder 41 to the ram 33 through its bearing surface 52 bearing against surface 53, whereby the die 40 is effectively protected from some of the axial extrusion forces, i.e., those acting against the die holder 41, to thereby effectively increase the operating life of die 40.

As previously mentioned the outer sealing surface 45 provided on the die holder 41 is a substantially right circular cylindrical surface. In this example of the invention a circumferential groove designated by the numeral 55 extends radially inwardly beneath the cylindrical surface 45 to enable provision of an improved sliding fit between the die holder 41 and the right circular cylindrical surface 22 provided in container 21. The groove 55 also defines grasping means for grasping the die holder and removing it from the end of the die 40 at the completion of an extrusion cycle in a manner as will be subsequently described.

As the billet 24 is extruded by the apparatus 20, in the manner illustrated in FIG. 2 of the drawings, a butt portion or butt 57 of such billet usually remains within the container 21 and must be sheared away from the extruded member 44 to be withdrawn and a new billet inserted in position to commence another extrusion cycle. The exemplary apparatus 20 includes a shear designated by the numeral 60, see FIG. 3, for removing or shearing the butt portion 57 after extruding the main portion of the billet 24 through the die orifice 42. The shear 60 is adapted to suitably move toward and away from the elongated axis of chamber 23 in container 21 adjacent the plugged end of chamber 23.

To shear the butt away at the completion of an extrusion stroke, the die 40 and ram 33 are used to push the butt 57 through the chamber 23 after moving the blank 25 away in the manner illustrated in FIG. 3. The shear 60 is then utilized to engage the butt 57 and separate, i.e. shear, it away from the extruded member 44 enabling the member 44 to be withdrawn and the die holder 41 removed in preparation for another extrusion cycle and in a manner as will be presently described.

After shearing the butt 57 the shear 60 is retracted and the ram 33 is further extended through the chamber 23 so that the die 40 and die holder 41 are substantially exposed in the manner illustrated in FIG. 4 of the drawings. The shear 60 may then be utilized, if desired, so that its tip 61 is inserted within groove 55 and with tip 61 thus inserted the ram 33 and die 40 may be retracted to readily detach the die holder 41 from the die 40. The frustoconical surfaces 46 and 47 enable the die holder 41 to be readily removed from the die 40 because of their unique configuration and dimensional arrangement as described in detail earlier.

With the die holder 41 removed it will be appreciated that the ram 33 and die 40 may be retracted in an unrestrained manner from within the chamber 23 of container 21 without rubbing, galling, or unnecessary wear of the die 40 or of the inside cylindrical surface 22 of container 21. Thus, it will be appreciated that the operating lives of the die 40 and container 21 are effectively lengthened enabling the provision of extrusions more economically, and, the extrusion cycle is effectively shortened because it requires less time to retract the ram 33 and die 40 from within the chamber 23 because the die 40 is not restrained in any way.

Although in this example of the invention the shear 60 has been described as being utilized to hold the die holder or ring 41 while retracting the die 40 and ram 33, it will be appreciated that the die 40 and die holder 41 may be relatively moved in opposite directions in any desired manner to accomplish such separation.

The die holder or ring 41 has an annular planar surface defining its forward end and designated by the numeral 64. Annular surface 64 is arranged so that it extends perpendicular to the central axis of the die holder 41. The die 40 also has a cooperating substantially planar surface 65 extending perpendicular to its central axis and with the die holder 41 installed in position in a concentric manner around die 40 the planar surfaces 64 and 65 lie substantially in a common plane and are adapted to engage the billet 24 to enable extrusion of such billet through the die orifice 42.

Having described in detail the various operating component parts of apparatus 20 as well as describing in some detail the manner of indirectly extruding a billet 24, a brief general description will now be made to emphasize the manner in which a billet 24 may be extruded efficiently and economically utilizing the apparatus and method of this invention so that it will be readily apparent how the problems and limitations of previously proposed apparatus and methods have been overcome by this invention.

Thus, as seen in FIG. 1, the billet 24 is placed in the container 21 and blank 25 moved and firmly held into position to plug or close the open end of chamber 23 provided in container 21. The die 40 with its readily detachable die holder 41 supported concentrically therearound is then moved toward the container 21 and compressed against the billet 24 so that elongated member 44 is indirectly extruded through the die orifice 42, and through opening 34 and bore 37.

The billet 24 is extruded so that at the completion of the extrusion cycle, indicated in FIG. 2, the butt portion 57 remains and the major portion of the billet has been extruded to define extruded member 44. The blank 25 is then moved away in the manner illustrated in FIG. 3 and the butt 57 is pushed through the chamber 23 by the ram 33 and die 40 so that it extends beyond the rear of the container 21.

The butt portion 57 is then sheared away utilizing shear 60. The shear 60 is then again moved away and the ram 33 further inserted through chamber 23 so that the die 40 and die holder 41 extends out of the end of the container 21.

The construction and arrangement of the die holder 41 is such that it may be easily separated or detached from the die 40 by inserting the end portion 61 of shear 60 within groove 55 provided in the die holder 41 and then moving the die 40 asd ram 33 away from the die holder 41. However, as previously indicated, any suitable means may be utilized for relatively moving the die 40 and die holder 41 apart at the completion of the extrusion cycle.

With the die holder 41 removed there is considerable space indicated at 66 between the outside surface of the ram 33 and the surface 22 defining chamber 23. Also, the die 40 is considerably smaller in diameter than the ram 33. Thus, the ram 33 and die 40 may be withdrawn from within the container in an unrestrained manner.

With the ram 33 and die 40 removed from within chamber 23 another billet 24 may be inserted in position, as illustrated in FIG. 5, and the die holder may be moved and again supported concentrically around the die 40.

This technique lends itself to the use of a plurality of identical die holders 41. As the die holder 41 is removed in the manner illustrated in FIG. 4 the extruded member 44 may be immediately removed, the ram 33 and die 40 withdrawn and another die holder 41 positioned concentrically around the die 40 in the manner illustrated in FIG. 5, whereby the operating cycle is substantially reduced.

Any number of die holders 41 may be utilized and kept in readiness so that upon completing each extrusion cycle and while the die holder 41 which was immediately removed is being handled and prepared for reuse another identical die holder 41 may be installed in position to again commence the extrusion cycle in the manner illustrated in FIG. 1. Thus, it will be appreciated that this technique of using a plurality of die holders eliminates the time required to ready the original die holder for use. Yet, the extruded member has the dimensional precision and the orientation which is only effectively provided by a die fixed to the front of a hollow ram.

The die 40 is generally a comparatively expensive member. However, it will be appreciated that the die receives comparatively little wear and tear except for its intended function of extruding metal through its extrusion orifice 42, whereby the die 40 can be utilized for a substantially longer period of time.

With the unique die and die holder of this invention wear only occurs during actual extrusion because the die holder 41 is readily removed after completion of each extrusion cycle; therefore, the total amount of wear on the die holder 41, as well as on the surface 22 of container 21 is kept at a minimum. In addition, the die holder 41 may be made comparatively inexpensively, as compared to the die, whereby greater economy is also realized because of this fact.

Because the die holder 41 is made as a separate piece and utilized in the manner described in detail above, greater effort can be concentrated in making the die holder so that an improved seal is provided between its sealing surface 45 and the surface 22 of container 21. Also, the proper effort can be expended toward making the die 40 a more permanent die and efficiently operating die.

As explained in detail above, the die 40 is fixed to the front end of the ram 33 and requires no handling except to replace it after substantial wear of its extruding orifice 42. In addition, because the die 40 is fixed to the front end of ram 33 it always provides the extruded member 44 so that it leaves the extrusion apparatus 20 in the proper orientation. In particular, the die 40 is bolted to the ram so that it is always accurately centered with respect to the ram and the die holder functions to always precisely align the die 40 along the surface 22 defining chamber 23 during the process of extruding an associated billet 24.

The word billet has been utilized throughout this disclosure and it is to be understood that such word is applicable to a metal billet which is to be indirectly extruded as well as to a non-metal billet, such as plastic, for example.

It will also be appreciated that in extruding a plastic billet that suitable heating means may also be utilized in association with the apparatus 20 of this invention to facilitate indirect extrusion of such plastic.

While present exemplary embodiments of this invention, and methods of practicing the same, have been illustrated and described, it will be recognized that this invention may be otherwise variously embodied and practiced within the scope of the following claims.

What is claimed is:

1. In combination: a container having an inside surface defining a chamber for receiving a billet to be indirectly extruded, a blank for sealing one end of said chamber upon placing a billet therewithin, a ram having an extrusion receiving opening extending therethrough, a die fixed to the front of said ram for movement therewith and having a die orifice which is arranged in aligned relation with said extrusion receiving opening, and a readily detachable die holder supported around said die and having an outer sealing surface adapted to be slidably moved along said inside surface of said container to prevent said billet material from extruding between said sealing surface and said inside surface during extruding movement of said die and die holder against a billet, said die holder precisely locating and holding said die during said extruding movement and being readily detachable from said die at the completion of said extruding movement by relatively moving said die and die holder in opposite directions and said die holder providing maximum protection for said die and enabling unrestrained retraction of said die and ram out of said chamber upon removing said die holder to effectively lengthen the operating life of said die and container as well as shorten the extrusion cycle.

2. The combination as set forth in claim 1 in which said die holder has a first surface, said die has a cooperating second surface which is adapted to be engaged by said first surface during said extruding movement causing said die holder to precisely locate and hold said die in position within said chamber, said first and second surfaces assuring said die holder and die are supported in a non-jamming manner and are readily detached by relative movement thereof in said opposite directions.

3. The combination as set forth in claim 2 in which said die holder comprises a protective ring having an inner frustoconical surface defining said first surface and said die comprises a cooperating frustoconical surface defining the outer periphery thereof, said frustoconical surfaces being tapered away from said ram with said die and die holder installed in position.

4. The combination as set forth in claim 3 in which said ring has an annular planar surface extending perpendicular to its central axis and said die has a cooperating planar surface extending perpendicular to its central axis and with said die holder installed in position said planar surfaces lie substantially in a common plane and are adapted to engage said billet.

5. The combination as set forth in claim 1 in which said inside surface comprises a first right circular cylindrical surface and said outer sealing surface comprises a cooperating second right circular cylindrical surface.

6. The combination as set forth in claim 5 in which said die holder further comprises a circumferential groove extending radially inwardly beneath said second right circular cylindrical surface to enable provision of an improved sliding fit between said die holder and said first right circular cylindrical surface as well as defining a grasping surface for grasping said die holder.

7. The combination as set forth in claim 1 in which said die holder has a first bearing surface comprising its inner end and said ram has a cooperating annular bearing surface extending radially outwardly of said die, said first bearing surface being arranged to support substantially all axial forces exerted against said die holder toward said ram.

8. The combination as set forth in claim 1 and further comprising a shear for removing a remaining butt portion of said billet after extruding the main portion thereof through said die orifice.

9. The combination as set forth in claim 1 in which said die is detachably fixed to said ram to enable replacement of said die.

10. A method of indirectly extruding a billet comprising the steps of, placing a billet in a chamber of a container having open ends, closing one end of said chamber with a blank, fixing a die having a die orifice at the end of a ram having an extrusion receiving opening extending therethrough with said die orifice aligned with said extrusion receiving opening and to assure said die and die orifice are always precisely positioned relative to said ram, supporting a die holder around said die in a readily detachable manner, extruding said billet through said die orifice and extrusion receiving opening by relatively moving said die and die holder toward said container, and separating said die and die holder at the completion of said extruding step to enable unrestrained withdrawal of said die and ram from within said chamber and effectively lengthen the life of said die and shorten the extrusion cycle, said die holder being adapted to be moved to the forward end of said container and placed in position during said supporting step.

11. A method as set forth in claim 10 comprising the further step of shearing any remaining butt of said billet from within said chamber with a shear after said extruding step.

12. A method as set forth in claim 11 in which said separating step comprises the steps of holding said die holder with said shear and withdrawing said die and ram with said die holder thus held.

13. A method as set forth in claim 12 comprising the further steps of supporting a second die holder around said die immediately upon withdrawing said ram and die from within said chamber, said second die holder enabling immediate resumption of the extrusion operation by eliminating the time required to ready the original die holder for use.

14. A method as set forth in claim 10 in which said step of supporting a die holder around said die comprises supporting a die holder having a sealing surface adapted to slidably engage an associated inside surface of said container which defines said chamber to prevent extrusion of billet material past said sealing surface during said extruding step and said die holder further comprising a first surface which is adapted to engage a cooperating second surface on said die to precisely locate and hold said die within said chamber during said extruding step said first and second surfaces being urged together in a nonjamming manner during said extruding step and enable said die and die holder to be easily separated during said separating step.

15. A method as set forth in claim 10 in which said step of supporting said die holder around said die comprises supporting said die holder in such a manner that substantially all axial forces exerted against said die holder toward said ram are transmitted directly therethrough to said ram thereby assuring said die is protected from some of the axial forces to effectively increase its operating life.

16. A method as set forth in claim 15 in which said fixing step comprises detachably fixing said die to the end of said ram.

17. A readily detachable die holder for an indirect extrusion apparatus comprising an outer sealing surface adapted to be slidably moved along the inside surface of an associated billet container and a first surface adapted to engage a cooperating second surface of an associated die with said die being fixed to the terminal end of an associated hollow rim, said first surface being urged against said second surface causing said die holder to precisely locate said die drawing movement of said die and die holder in the same direction along said inside surface and said first surface enabling said die holder to be readily detached from said die upon relatively moving said die and die holder in opposite directions.

18. A die holder as set forth in claim 17 in which said first surface comprises a frustoconical surface and said second surface comprises a cooperating frustoconical surface defining the outer periphery of said die so that said die holder is supported by said die concentrically therearound and serves as a protective ring for said die.

19. A die holder as set forth in claim 18 further comprising a first bearing surface comprising its inner end and adapted to bear against a cooperating bearing surface of said ram, said first bearing surface being arranged to assure that substantially all axial forces exerted against said die holder toward said ram are supported thereby and thus enable said first surface to provide a precise locating function free of jamming.

20. A die holder as set forth in claim 17 in which said outer sealing surface comprises a substantially cylindrical sealing surface adapted to be moved along a cooperating cylindrical surface defining said inside surface of said billet container and said die holder further comprises a circumferential groove extending radially inwardly beneath said cylindrical surface to enable provision of an improved sliding fit between said die holder and said inside surface as well as defining a grasping surface for grasping said die holder.

References Cited

UNITED STATES PATENTS

| | | | |
|---|---|---|---|
| 2,539,564 | 1/1951 | Barrett | 72—273 X |
| 2,157,988 | 5/1939 | Knapp | 72—269 |
| 1,661,594 | 3/1928 | Born | 72—273 |
| 1,367,187 | 2/1921 | Barnes | 72—264 |

FOREIGN PATENTS

| | | |
|---|---|---|
| 254,293 | 8/1926 | Great Britain. |
| 429,216 | 5/1925 | Germany. |
| 392,058 | 11/1908 | France. |
| 1,127,305 | 4/1962 | Germany. |

CHARLES W. LANHAM, Primary Examiner

A. L. HAVIS, Assistant Examiner

U.S. Cl. X.R.

72—273